US010937070B2

(12) United States Patent
Sahoo et al.

(10) Patent No.: US 10,937,070 B2
(45) Date of Patent: Mar. 2, 2021

(54) COLLABORATIVE FILTERING TO GENERATE RECOMMENDATIONS

(71) Applicant: Dell Products L.P., Round Rock, TX (US)

(72) Inventors: Sumant Sahoo, Bangalore (IN); Ramakanth Kanagovi, Bangalore (IN)

(73) Assignee: Dell Products L.P., Round Rock, TX (US)

(*) Notice: Subject to any disclaimer, the term of this patent is extended or adjusted under 35 U.S.C. 154(b) by 358 days.

(21) Appl. No.: 15/873,285

(22) Filed: Jan. 17, 2018

(65) Prior Publication Data

US 2019/0220909 A1 Jul. 18, 2019

(51) Int. Cl.
| | |
|---|---|
| *G06Q 30/02* | (2012.01) |
| *G06F 17/17* | (2006.01) |
| *G06Q 10/06* | (2012.01) |
| *G06F 16/9535* | (2019.01) |
| *G06F 16/9536* | (2019.01) |

(52) U.S. Cl.
CPC ..... *G06Q 30/0282* (2013.01); *G06F 16/9535* (2019.01); *G06F 16/9536* (2019.01); *G06F 17/17* (2013.01); *G06Q 10/067* (2013.01); *G06Q 30/0201* (2013.01)

(58) Field of Classification Search
CPC .. G06F 16/9535; G06F 16/9536; G06F 17/17; G06Q 10/067; G06Q 30/0201; G06Q 30/0282
See application file for complete search history.

(56) References Cited

U.S. PATENT DOCUMENTS

| | | | | |
|---|---|---|---|---|
| 6,912,505 B2* | 6/2005 | Linden | ............... | G06Q 30/0633 |
| | | | | 705/14.53 |
| 6,941,321 B2* | 9/2005 | Schuetze | ............... | G06F 16/355 |
| 7,571,121 B2* | 8/2009 | Bezos | ................... | G06Q 30/02 |
| | | | | 705/26.7 |

(Continued)

FOREIGN PATENT DOCUMENTS

KR 20140033312 A * 3/2018

OTHER PUBLICATIONS

IBM Terminology "W" https://web.archive.org/web/20111003190813/http://www-01.ibm.com/software/globalization/terminology/w.html (Year: 2011).*

(Continued)

*Primary Examiner* — Paul R Fisher
*Assistant Examiner* — Andrew Chase Lakhani
(74) *Attorney, Agent, or Firm* — Terrile, Cannatti & Chambers; Stephen A. Terrile

(57) ABSTRACT

A system, method, and computer-readable medium are disclosed for performing a recommendation operation, comprising: optimizing a product list to provide an optimized product list for use when generating a recommendation for an account; optimizing a neighbor set to provide an optimized neighbor set for use when generating the recommendation for the account; boosting a self-cosine similarity metric to provide a boosted self-cosine similarity metric, the self-cosine similarity metric corresponding to the account; and, providing a recommendation for the account, the recommendation being based on the optimized product list, the optimized neighbor set and the boosted self-cosine similarity metric.

20 Claims, 8 Drawing Sheets

(56) References Cited

U.S. PATENT DOCUMENTS

| | | | | |
|---|---|---|---|---|
| 8,489,527 | B2* | 7/2013 | van Coppenolle | H04N 21/2542 706/20 |
| 8,533,067 | B1* | 9/2013 | Kane, Jr. | G06Q 30/02 705/26.7 |
| 10,503,829 | B2* | 12/2019 | Payne | G06F 40/253 |
| 2002/0154555 | A1* | 10/2002 | Krueger | G06F 8/00 365/200 |
| 2005/0171860 | A1* | 8/2005 | Westphal | G06Q 30/02 705/26.7 |
| 2006/0190225 | A1* | 8/2006 | Brand | G06F 16/9535 703/2 |
| 2010/0250556 | A1* | 9/2010 | Park | G06F 16/335 707/749 |
| 2010/0268661 | A1* | 10/2010 | Levy | G06Q 30/02 705/347 |
| 2011/0282821 | A1* | 11/2011 | Levy | G06Q 30/0631 706/47 |
| 2016/0294961 | A1* | 10/2016 | Cordes | G06Q 30/0631 |
| 2016/0300144 | A1* | 10/2016 | Santhanam | G06Q 30/0631 |
| 2017/0116527 | A1* | 4/2017 | Cohen | G06N 5/04 |
| 2018/0075512 | A1* | 3/2018 | Bui | G06F 7/08 |
| 2019/0026786 | A1* | 1/2019 | Khoury | G06Q 30/0271 |

OTHER PUBLICATIONS

IBM Terminology "C" https://web.archive.org/web/20111002234604/http://www-01.ibm.com/software/globalization/terminology/c.html (Year: 2011).*

IBM Terminology "S" https://web.archive.org/web/20111003082830/http://www-01.ibm.com/software/globalization/terminology/s.html (Year: 2011).*

IBM Terminology "P" https://web.archive.org/web/20111003133041/http://www-01.ibm.com/software/globalization/terminology/p.html (Year: 2011).*

IBM Terminology "D" https://web.archive.org/web/20111003133046/http://www-01.ibm.com/software/globalization/terminology/r.html (Year: 2011).*

IBM Terminology "R" https://web.archive.org/web/20111003133031/http://www-01.ibm.com/software/globalization/terminology/d.html (Year: 2011).*

IBM Terminology "M" https://web.archive.org/web/20111003133036/http://www-01.ibm.com/software/globalization/terminology/d.html (Year: 2011).*

Breese, John S., et al, "Empirical Analysis of Predictive Algorithms for Collaborative Filtering" Microsoft Research, UAI 1998: Proceedings of the Fourteenth conference on Uncertainty in artificial intelligent p. 43-52, https://dl.acm.org/doi/10.5555/2074094.2074100 accessed Feb. 24, 2019 (Year: 1998).*

Herlocker et al "An Empirical Analysis of Design Choices in Neighborhood-Based Collaborative Filtering" https://dl.acm.org/doi/10.1023/A%3A1020443909834, accessed Feb. 24, 2019. (Year: 2002).*

Pera, M. (2014). "Using Online Data Sources to Make Recommendations on Reading Materials for K-12 and Advanced Readers". Brigham Young University, BYUScholarsArchive (Year: 2014).*

Lee, Danielle H. (2012) "Personalized Recommendations Based on User's Information-Centered Social Networks", University of Pittsburgh School of Information Sciences (Year: 2012).*

Kluver, Daniel (2018), "Improvements in Holistic Recommender Systems", University of Minnesota (Year: 2018).*

Moon, Sangkil and Russell, Gary (2008) "Predicting Product Purchases from Inferred Customer Similarity: An Autologistic Model Approach" Management Science vol. 54, No. 1, Jan. 2008, pp. 71-82 (Year: 2008).*

Su, Xiaoyuan and Khoshgoftaar, Taghi M. Survey of Collaborative Filtering Techniques, Hindawi Publishing Corporation, Advances in Artificial Intelligence vol. 2009 (Year: 2009).*

Fractal Analytics, Inc., Recommender Systems: Framework for non-digital B2B domain, 2015, http://learn.fractalanalytics.com/rs/fractalanalytics/images/WP-Recommender%20Systems%20Framework%20for%20Non-Digital%20B2B%20domain.pdf.

Greg Linden et al., Amazon.com Recommendations, Item-to-Item Collaborative Filtering, Industry Report, IEEE Internet Computing, Jan.-Feb. 2003, https://disco.ethz.ch/courses/fs10/seminar/paper/michael-2.pdf.

* cited by examiner

| Account ID | PowerEdge | Dell Storage SC | Cloud Products | Latitude | OptiPlex |
|---|---|---|---|---|---|
| 231674514 | $415 K | - | $990 K | $303 K | - |

*Figure 4*

| Account ID | PowerEdge | Vostro |
|---|---|---|
| 231674514 | $41 K | $23 K |

*Figure 5*

| Account ID | PowerEdge | Dell Storage SC | Cloud Products | Latitude | OptiPlex | Vostro |
|---|---|---|---|---|---|---|
| 231674514 | $75.58 K | - | $82.5 K | $25.25 K | - | $23k |
| ... | | | | | | ... |
| ... | | | | | | ... |

*Figure 6*

| Account ID | PowerEdge | Dell Storage SC | Cloud Products | Latitude | OptiPlex | Vostro |
|---|---|---|---|---|---|---|
| 231674514 | 0.37 | - | 0.40 | 0.12 | - | 0.11 |
| ... | | | | | | ... |
| ... | | | | | | ... |

*Figure 7*

| Account ID | Neighbor | CSM |
|---|---|---|
| 231674514 | 231674514 | 1.00 |
| 231674514 | 204334282 | 0.12 |
| 231674514 | 624547824 | 0.95 |
| 231674514 | 858257979 | 0.31 |
| 231674514 | 840146625 | 0.85 |
| 231674514 | 624547824 | 0.99 |
| ... | ... | ... |

*Figure 8*

| Account ID | PowerEdge | DellStorage SC | CloudProducts | Latitude | OptiPlex | Vostro | HF |
|---|---|---|---|---|---|---|---|
| 231674514 | 0.37 | - | 0.40 | 0.12 | - | 0.11 | 6/4 |
| ... | | | | | | ... | ... |
| ... | | | | | | ... | ... |

*Figure 9*

| Account ID | Neighbor | CSM | HF |
|---|---|---|---|
| 231674514 | 231674514 | 1.00 | 1.50 |
| 231674514 | 204334282 | 0.12 | - |
| 231674514 | 624547824 | 0.95 | - |
| 231674514 | 858257979 | 0.31 | - |
| 231674514 | 840146625 | 0.85 | - |
| 231674514 | 624547824 | 0.99 | - |
| ... | ... | ... | ... |

*Figure 10*

| Account ID | Neighbor | CSM | HF | RF-CSM |
|---|---|---|---|---|
| 231674514 | 231674514 | 1.00 | 1.50 | 1.50 |
| 231674514 | 204334282 | 0.12 | - | 0.12 |
| 231674514 | 624547824 | 0.95 | - | 0.95 |
| 231674514 | 858257979 | 0.31 | - | 0.31 |
| 231674514 | 840146625 | 0.85 | - | 0.85 |
| 231674514 | 624547824 | 0.99 | - | 0.99 |
| ... | ... | ... | ... | ... |

*Figure 11*

| MerchantID | AccountID | Number | Quantities | PartStoresS.S. | LP1 | ... | GP1 | SP1 |
|---|---|---|---|---|---|---|---|---|
| 1 | 231674514 | 231674514 | 0.37 | - | ... | ... | ... | 1.50 |
| | 231674514 | 624547824 | 0.45 | 0.22 | ... | ... | ... | 0.95 |
| | 231674514 | 840146625 | 0.36 | 0.10 | ... | ... | ... | 0.85 |
| | 231674514 | 624547824 | 0.38 | - | ... | ... | ... | 0.99 |
| ... | | | | | | | | ... |

*Figure 12*

| MerchantID | Number | PS | PS | PS | PS | ... | PS |
|---|---|---|---|---|---|---|---|
| 1 | 231674514 | 0.63 | 0.11 | ... | ... | ... | ... |
| | 624547824 | 0.53 | -0.21 | ... | ... | ... | ... |
| | 840146625 | 0.55 | -0.12 | ... | ... | ... | ... |
| | 624547824 | 0.56 | -0.23 | ... | ... | ... | ... |
| ... | | | | | | | |

*Figure 13*

| MerchantID | AccountID | PartStoresS.S. | ... | GP1 |
|---|---|---|---|---|
| 1 | 231674514 | 0.23 | 0.12 | ... |
| ... | | | | ... |

*Figure 14*

| Account ID | Vendor ID | Spend | Previous Spend | Lifetime Spend |
|---|---|---|---|---|
| 231674514 | 231674514 | 1.50 | 0.92 | 1.50 * 0.92 = 1.38 |
| 231674514 | 624547824 | 0.95 | - | 0.95 |
| 231674514 | 840146625 | 0.85 | - | 0.85 |
| 231674514 | 624547824 | 0.99 | - | 0.99 |
| ... | ... | ... | ... | ... |

*Figure 15*

| Account ID | Vendor ID | Lifetime Spend | Probability | Predicted Spend | ... |
|---|---|---|---|---|---|
| 231674514 | 231674514 | 1.38 | 0.37 | - | ... |
|  | 624547824 | 0.95 | 0.45 | 0.22 | ... |
|  | 840146625 | 0.85 | 0.36 | 0.10 | ... |
|  | 624547824 | 0.99 | 0.38 | - | ... |
| ... | ... | ... | ... | ... | ... |

*Figure 16*

COLLABORATIVE FILTERING TO GENERATE RECOMMENDATIONS

BACKGROUND OF THE INVENTION

Field of the Invention

The present invention relates to information handling systems. More specifically, embodiments of the invention relate to using collaborative filtering with self-boosted and principal component adjusted weights using an optimal neighbor set to generate recommendations.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to attempt to determine (such as identifying or predicting) individual visitor intent online such as when a visitor visits an ecommerce site. Known techniques often determine the intent and then personalize the visitor experience on the site such as providing recommendations.

SUMMARY OF THE INVENTION

A system, method, and computer-readable medium are disclosed for performing a recommendation operation. In certain embodiments, the recommendation operation uses collaborative filtering with self-boosted and principal component adjusted weights using an optimal neighbor set to generate recommendations In certain embodiments, the recommendation operation is tailored for business to business (B2B) transactions. In certain embodiments, for business to business transactions, the recommendation operation boosts a user's historic weights while at the same time normalizing the interaction. In certain embodiments, the interaction is normalized via a principal component approach so that the recommendation operation learns from its neighbors (i.e., interactions of other users from the same business). This blend of self-boosting and principal component adjusted weights is used as variables to improve the result of a collaborative filtering (CF) operation.

In certain embodiments, the recommendation operation uses cues from a sales funnel. Various aspects of the disclosure include an appreciation that known collaborative filtering uses historic order information to generate recommendations. The recommendation operation also considers an open sales pipeline when generating the recommendation. In certain embodiments, the open sales pipeline is for the immediate next quarter.

In certain embodiments, the recommendation operation generates a personalized visitor experience. In certain embodiments, the personalized visitor experience includes personalized targeted offers, personalized product showcase, personalized web site navigation etc.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 shows a table of example revenue data for a plurality of business segments.

FIG. 5 shows a table of next quarter sales pipeline weighted revenue for an example account.

FIG. 6 shows a table of example average revenue data for an account for a plurality of business segments.

FIG. 7 shows a table of example revenue proportion data for an account for a plurality of business segments.

FIG. 8 shows a table of example cosine similarity metrics for a plurality of accounts.

FIG. 9 shows a table of example revenue proportion data for an account for a plurality of business segments along with the homogeneity factor ratio for the account.

FIG. 10 shows a table of example cosine similarity metrics for a plurality of accounts along with the homogeneity factor for the account.

FIG. 11 shows a table of example cosine similarity metrics for a plurality of accounts along with the homogeneity factor and a self-boosted cosine similarity metric for the account.

FIG. 12 shows a table of a plurality of accounts having a revenue proportion vector.

FIG. 13 shows a table of rotated principal component loading on each account revenue proportion vector.

FIG. 14 shows a table of a plurality of accounts where the TRP is standardized between [0,1].

FIG. 15 shows a table of a plurality of accounts where the principal account includes a normalized SB-CSM value.

FIG. 16 shows a table of a plurality of accounts where the weighted average score for each LOB for an account are sorted.

DETAILED DESCRIPTION

Figure 1:
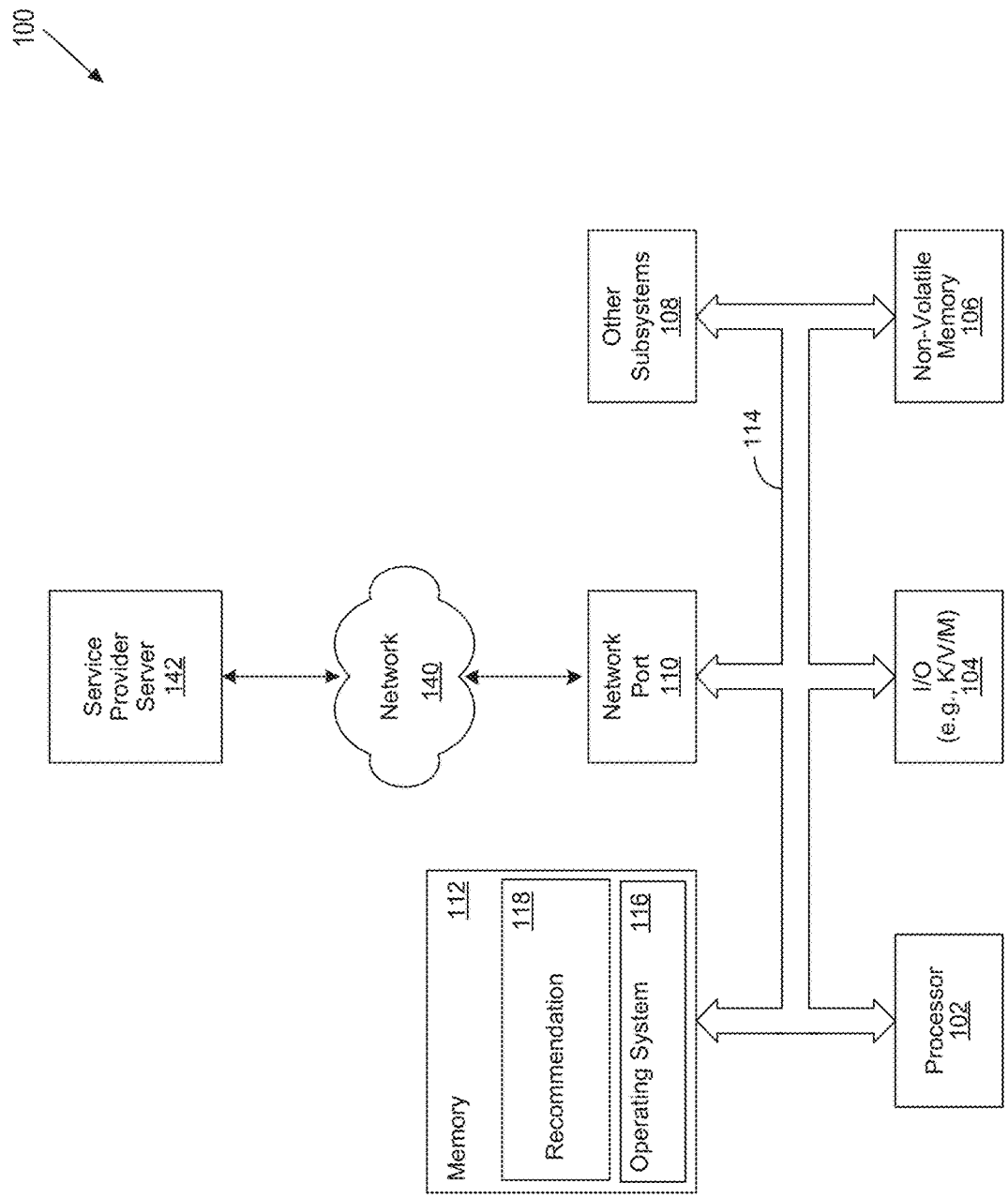
FIG. 1 shows a general illustration of components of an information handling system as implemented in the system and method of the present invention.

Various aspects of the disclosure include an appreciation that recommender systems are becoming popular to provide businesses with intelligence of what customers are most likely to purchase next. Recommender systems mine data (often massive amounts of data) to derive patterns out of customers' past purchase behaviors and predict potential purchases in future. Various aspects of the disclosure include an appreciation that recommendation operations are generally directed to customers in business to customer (B2C) type interactions. Various aspects of the present disclosure include an appreciation that known recommendation operations tend to include item-item based operations and user-user based operations. Collaborative filtering (CF) is often applied when generating recommendations. Collaborative filtering uses known preferences of a group of users to predict an unknown preference of a new user. Various aspects of the present disclosure include an appreciation that known collaborative filtering operations present challenges when applied to business to business interactions. Known collaborative filtering operations often provide equal weightage to a customer's own historic purchases as against that of neighbors. In business to business interactions, customers tend to refresh products that they have purchased in the past. Accordingly, various aspects of the present disclosure include an appreciation that boosted self-cosine weightage can be used to increase the accuracy of recommendations.

Various aspects of the present disclosure include an appreciation that a sub-optimal product list considered in the data can cause an undesirable computational overhead. This is especially important in B2B scenarios where there are many product types, while the skewness of purchases may be limited to a few product types. Various aspects of the present disclosure include an appreciation that a sub-optimal neighbor set with a heuristic cosine similarity threshold can increase computational burden along with involving subjectivity in choosing a threshold.

Accordingly, an improved collaborative filtering recommender system for business to business interactions is disclosed. Such an improved collaborative filtering recommender system boosts the weightage of individual account's preferences based on their past purchases and future opportunities. Additionally, the improved collaborative filtering recommender system optimizes a neighbor sample size along with optimizing a product list to be considered. Such an improved collaborative filtering recommender system provides higher performance in terms of accuracy and generates more personalized recommendations as compared to other recommender systems used in business to business scenarios.

Various aspects of the disclosure include an appreciation of the challenges associated with providing recommendations in a B2B environment as compared with recommendation in a B2C environment. In a B2C environment there are often a wide variety of products for customers to select. Additionally, in a B2C environment, purchases are often sparse and can be somewhat uniformly distributed across products. In such cases where the purchases are rare, the ability to recommend a product for a user depends heavily on learning from others in larger available dataset. Thus Item-Item or User-User Collaborative Filtering (UUCF) operations are often used to solve various business cases in a B2C segment. For example, in a UUCF, each user gathers a set of closest neighbors from which it tends to learn along with learning from itself. With such an operation, a neighbor set is formed based on a distance metric like a cosine similarity metric (CSM). A threshold is subjectively set on the CSM to determine how many neighbors to include. Once the neighbor set for each user is formed, a weighted average recommendation score (WARS) is estimated for each user across all the products available in the catalog. The weights correspond to CSM values computed for a particular user against itself as well as the rest of the users in the neighbor set. These CSM values are often applied as weights on revenue proportion of all users in the neighbor set across all products. The WARS is then derived based on this revenue proportion matrix and the CSM values. The WARS value thus derived is sorted in descending order and the products with top scores are recommended for the user. Various aspects of the disclosure include an appreciation that with certain B2C UUCF operations, the customer's self CSM value may be 1 as compared with neighbor set's CSM value of around 0.8 and 0.9. The relative closeness of these values works well in a B2C environment, as accuracy of recommendations depends on how well a user learns from the neighbors.

Various aspects of the present disclosure include an appreciation that a B2B environment often has a skewed denser account purchase matrix towards certain products from a large list available of available products. This purchasing pattern is because, in B2B, accounts organically invest in heavy amounts and for a long term usage often with rigorous study being performed before making changes to purchasing patterns. Additionally, in a B2B environment there are often times when a customer simply refreshes products that have been previously purchased. Various aspects of the present disclosure include an appreciation that while in a B2B environment customers invest in new products, purchase behavior is generally inclined towards refreshing already purchased products. Various aspects of the present disclosure include an appreciation that in a B2B environment, product hierarchies (e.g., stock keeping units (SKUs), Items, model/brand category up through lines of business (LOB)) can be categorized by group and then by type. For example, in certain embodiments, a categorization hierarchy might start at a line of business level (e.g., an Enterprise Solutions Group), then a Product Group level, then a Product type level (e.g., Servers) and then Product LOB level (e.g., Poweredge Servers). Further in certain embodiments, additional breakdown levels can include are Brand, Categories, SKUs, etc. In certain embodiments, the recommendation operation is performed to provide recommendations at a line of business level as a Product Category level. If a recommendation is provided at levels high up in the hierarchy then the number of product types can be limited. However, in cases where a recommendation is provided at a much more granular level then the number product types can be larger. Various aspects of the present disclosure include an appreciation that in a B2B environment, there could be a large number of accounts that are analyzed when generating recommendations.

Accordingly, the recommendation operation of the present disclosure also overcomes challenges generally associated with providing recommendations in a B2B environment. For example, the recommendation operation of the present disclosure overcomes the challenge of how to build a recommendation engine which factors in the distinct purchase behavior in a B2B scenario where loyal accounts tend to be inclined towards their historic purchases while new accounts tend to learn more from others. The recommendation operation of the present disclosure also overcomes the challenge of how to build a recommendation engine which can address the challenges associated with sub-optimal product list and/or a sub-optimal neighbor set. The recommendation operation of the present disclosure effectively reduces the computational intensity caused due to huge dataset. The recommendation operation of the present disclosure also effectively reduces sparsity in the dataset.

For purposes of this disclosure, an information handling system may include any, instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a recommendation system 118.

The recommendation system performs a recommendation operation. In certain embodiments, the recommendation operation is tailored for business to business (B2B) transactions. In certain embodiments, the recommendation operation uses collaborative filtering with self-boosted and principal component adjusted weights using an optimal neighbor set to generate recommendations. In certain embodiments, for business to business transactions, the recommendation operation boosts a users' historic weights while at the same time normalizing the interaction. In certain embodiments, the interaction is normalized via a principal component approach so that the recommendation operation learns from its neighbors (i.e., interactions of other users from the same business). This blend of self-boosting and principal component adjusted weights is used as variables to improve the result of a collaborative filtering (CF) operation. In certain embodiments, the recommendation operation uses cues from a sales funnel. Various aspects of the disclosure include an appreciation that known collaborative filtering uses historic order information to generate recommendations. The recommendation operation also considers an open sales pipeline when generating the recommendation. In certain embodiments, the open sales pipeline is for the immediate next quarter. In certain embodiments, the recommendation operation provides an industry agnostic solution. The disclosed recommendation operation functions with any business to business interaction to predict an account's immediate next interests. Such a recommendation operation advantageously boosts business to business transaction performance. For example, with a test operation of this recommendation operation, the disclosed recommendation operation provided a 10% increase in revenue coverage when compared to a previous collaborative filtering system.

In certain embodiments, the recommendation operation generates a personalized visitor experience. In certain embodiments, the personalized visitor experience includes personalized targeted offers, personalized product showcase, personalized web site navigation etc.

The recommendation system 118 performs a recommendation operation. The recommendation operation improves processor efficiency (and thus the efficiency of the information handling system 100) by efficiently generating recommendations for large scale product sets. As will be appreciated, once the information handling system 100 is configured to perform the recommendation operation, the information handling system 100 becomes a specialized computing device specifically configured to perform the recommendation operation and is not a general purpose computing device. Moreover, the implementation of the recommendation operation on the information handling system 100 improves the functionality of the information handling system and provides a useful and concrete result of generating recommendations that are tailored for a B2B environment.

Figure 2:
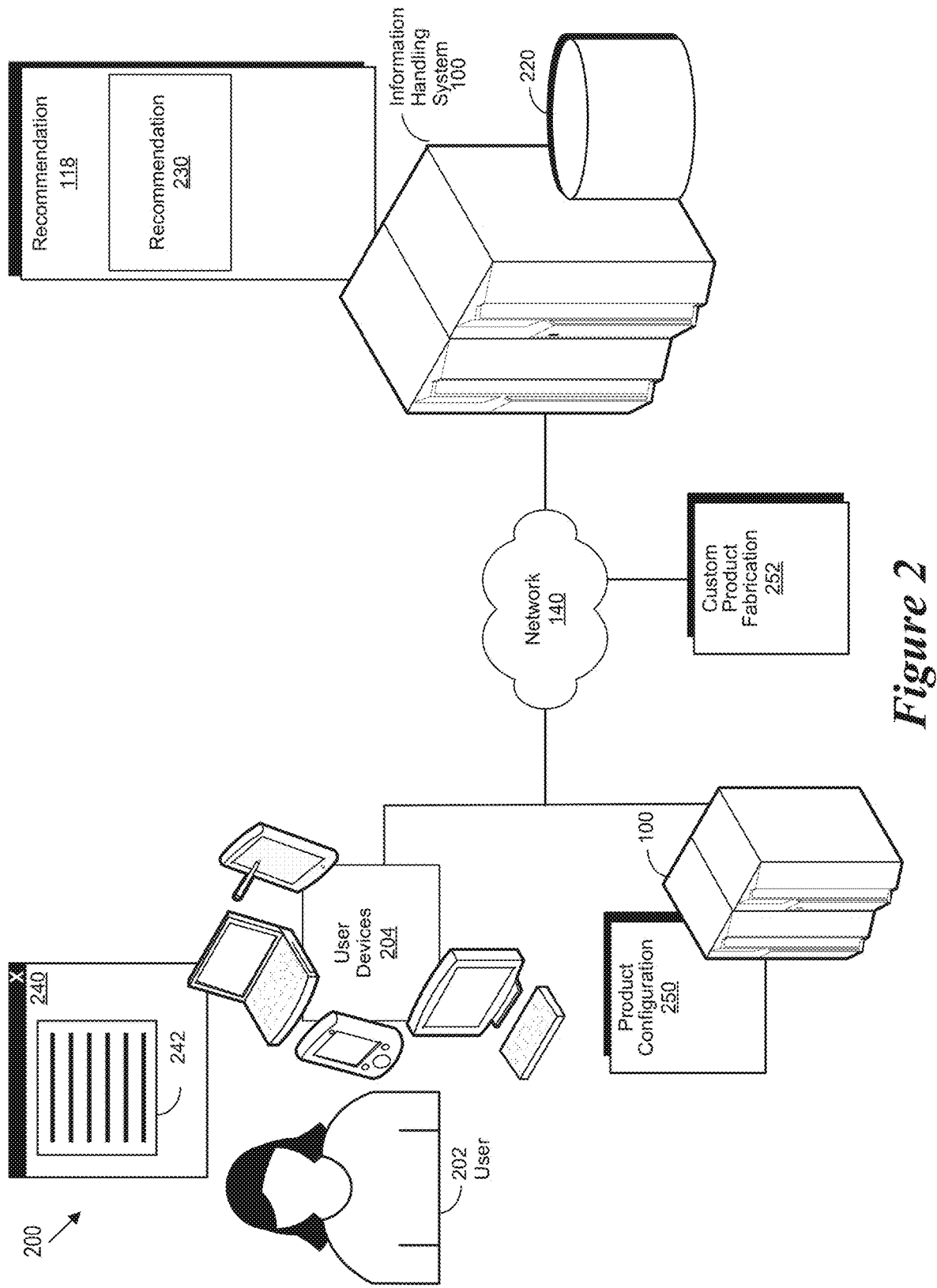
FIG. 2 shows a block diagram of a recommendation environment.

FIG. 2 is a block diagram of a recommendation environment 200 implemented in accordance with an embodiment of the invention. The recommendation environment 200 includes a recommendation system 118. In various embodiments, a user 202 accesses an ordering system (such as a configuration system) which is coupled to the recommendation system 118. In various embodiments, a recommendation system 118 executes on a hardware processor of an information handling system 100. In various embodiments, the user 202 may use a user device 204 to interact with the ordering system and the recommendation system 118.

As used herein, a user device 204 refers to an information handling system such as a personal computer, a laptop computer, a tablet computer, a personal digital assistant (PDA), a smart phone, a mobile telephone, or other device that is capable of communicating and processing data. In various embodiments, the user device is configured to present a recommendation interface 240, which may be included within a more general user interface such as a website user interface. In certain embodiments, the website user interface includes at least one of a configuration user interface and an Ecommerce user interface. In various embodiments, the recommendation interface 240 presents a graphical representation 242 of recommendations which are automatically generated in response to a user interaction. In various embodiments, the user device 204 is used to exchange information between the user 202 and the recommendation system 118 through the use of a network 140. In certain embodiments, the network 140 may be a public network, such as the Internet, a physical private network, a wireless network, a virtual private network (VPN), or any combination thereof. Skilled practitioners of the art will recognize that many such embodiments are possible and the foregoing is not intended to limit the spirit, scope or intent of the invention.

In various embodiments, the recommendation system 118 includes a recommendation module 230 which performs a recommendation operation.

In various embodiments, the recommendation environment 200 includes a storage repository 220 which stores various information used in the generation of recommendations. The storage repository may be local to the system executing the recommendation system 118 or may be executed remotely.

In various embodiments, the recommendation system 118 interacts with a product configuration system 250 which may be executing on a separate information handling system 100. In various embodiments, the product configuration system 250 interacts with a custom product fabrication system 252. In various embodiments, the custom product fabrication system 252 fabricates products to include components identified using the recommendation system 118. In various embodiments, the recommendation interface 240 may be presented via a website. In various embodiments, the website is provided by one or more of the recommendation system 118 and the product configuration system 250.

For the purposes of this disclosure a website may be defined as a collection of related web pages which are identified with a common domain name and is published on at least one web server. A website may be accessible via a public internet protocol (IP) network or a private local network. A web page is a document which is accessible via a browser which displays the web page via a display device of an information handling system. In various embodiments, the web page also includes the file which causes the document to be presented via the browser. In various embodiments, the web page may comprise a static web page which is delivered exactly as stored and a dynamic web page which is generated by a web application that is driven by software that enhances the web page via user input to a web server.

Accordingly, the present recommendation operation is optimized for interactions within a B2B environment. The present recommendation operation includes an appreciation that purchasing patterns of accounts in a B2B environment are often different from those in a B2C environment. More specifically, the present recommendation operation includes an appreciation that B2B accounts tend to remain loyal to certain product types that best suit their needs. Accordingly, the present recommendation operation boosts the accounts' historic weights and then normalizes the boosted historic weights so that the recommendation operation also learns from neighbors of the account. This blend of self-boosting and principal component adjusted weights enhances a collaborative filtering operation. The present recommendation operation also uses cues from a sales funnel when generating recommendations. While a B2C type CF considers historic order information to recommend for future, the present recommendation operation also considers future order information (e.g., an immediate next quarter open sales pipeline). The present recommendation operation also uses an optimized product and neighbor set. For the purposes of the present disclosure, interactions within a B2B environment may be defined as an interaction between a supplier and a purchaser where both the supplier and the purchaser are business entities. For the purposes of the present disclosure, interactions within a B2C environment may be defined as an interaction between a supplier and a purchaser where the supplier is a business entity and the purchaser an individual.

Figure 3:
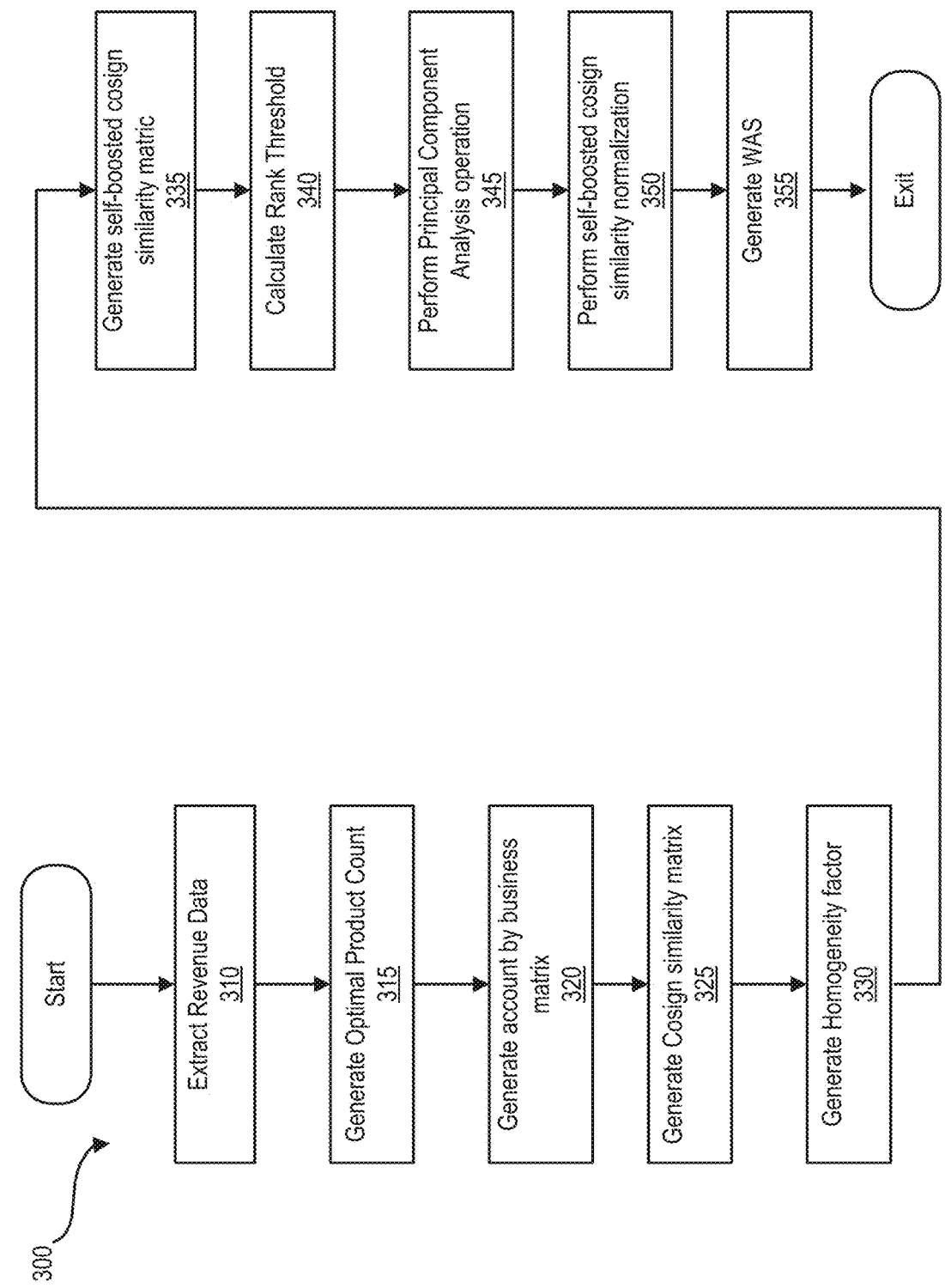
FIG. 3 shows a flow chart of a recommendation operation.

Referring to FIG. 3, a flow chart of a recommendation operation is shown. In certain embodiments, the recommendation operation provides a plurality of company segment recommendations for each account for a predetermined period of time. In certain embodiments the company segments correspond to company lines of business. In certain embodiments, the plurality of company recommendations corresponds to a predetermined number of company segment recommendations (e.g., 3 company segment recommendations. In certain embodiments, the predetermined period of time corresponds to a budget related period of time. In certain embodiments, the budget related period of time corresponds to an immediate next quarter.

More specifically, the recommendation operation begins at step 310 by extracting revenue data for accounts for which recommendations are to be generated. In certain embodiments, the revenue data is extracted from a relational database repository such as a Teradata repository. In certain embodiments, the revenue data comprises plurality of previous quarter revenue data. In certain embodiments, the plurality of previous quarter revenue data comprises last 12 quarters revenue data. In certain embodiments, the revenue data is extracted for each business segment. In certain embodiments, the revenue data is extracted for each line of business for the accounts in scope (i.e., the accounts for which recommendations are to be generated). FIG. 4 shows a table of example revenue data for a plurality of business segments. The example account is associated with a particular account identifier (ID). With the example table, the company includes five lines of business, a server line of business (e.g., PowerEdge), a storage line of business (e.g., Storage SC), a cloud products line of business (e.g., Cloud Products, a laptop line of business (e.g., Latitude) and a desktop line of business (e.g., OptiPlex).

In certain embodiments, the recommendation operation uses next quarter sales pipeline weighted revenue from a SalesForce Dot Com (SFDC) application at an account-line of business level. In certain embodiments, the SalesForce Dot Com application is a customer relationship management (CRM) application that manages pipeline and/or deal information. FIG. 5 shows a table of next quarter sales pipeline weighted revenue for an example account. For example, the pipeline weighted revenue shows business segment revenue (e.g. PowerEdge) as well as a product weighted revenue (e.g., Vostro).

Next, an optimal product count value is generated at step 315. The optimal product count metric compensates for a condition where certain business segments may not sell many products to a particular account. For example, if recommendations are to be provided at a granular SKU or line of business level, there could be a skewed sparsity of data in certain lines of business. Accordingly, presenting recommendations for all business segments may not be optimal in terms of value as well as computation benefit. When generating the optimal product count value, business segment account coverage is fitted into a normal distribution between the range of sold products. A certain lowest number of product counts for a business segment are discarded. For example, in one implementation a lower 5 percentile is empirically considered as lines of business which could cause non-informative sparsity in data. Thus all lines of business with less than 5 percentile threshold account overage are discarded to arrive at a rich and informative dataset.

Next, at step 320 an account by business segment matrix is generated. In certain embodiments, the accounts are associated with rows of the matrix and business segments are associated with columns of the matrix. With the account by business segment matrix, the cells are populated with a revenue proportion (RP) value. More specifically, the revenue proportion value is calculated as follows:

Revenue proportion (RP)=(AR for a LOB+PP for a LOB)÷(AR for all LOBs+PP for all LOBs)

For each account:
AR=Per quarter average revenue for each LOB
PP=Weighted Open Pipeline for immediate next quarter for each LOB In certain embodiments, the Weighted Open pipeline corresponds to an unweighted pipeline times a probability of deal conversion.

FIG. 6 shows a table of example average revenue data for an account for a plurality of business segments. FIG. 7 shows a table of example revenue proportion data for an account for a plurality of business segments. The revenue proportion vector for an account indicates the mix of product purchases. When performing a recommendation operation, the revenue proportion vector may be used to identify accounts with similar a product mix. With the recommendation operations, accounts with similar product mixes are identified as neighbors of the account.

Next, at step 325, a cosine similarity matrix is generated between all accounts based on the revenue proportion matrix. The cosine similarity matrix is used to identify a neighbor set for all accounts. Every account will have itself in its neighbor set with a CSM value of 1. In the present disclosure the range of the CSM is [0, 1]. A higher cosine similarity metric value represents a stronger similarity between accounts' purchase behavior. FIG. 8 shows a table of example cosine similarity metrics for a plurality of accounts.

Next at step 330 a homogeneity factor (HF) metric is generated. In a B2B environment a next immediate purchase for an account is highly dependent on historic purchases. This is because, accounts invest with a long term view, and commonly they refresh "past purchases". To factor this unique behavior, it is important to increase the self cosine similarity metric an account against itself. More specifically, the homogeneity factor for a particular account is generated as follows:

Homogeneity Factor (HF)=(Total no of LOBs)÷(No of LOBs an account has purchased in the past)

FIG. 9 shows a table of example revenue proportion data for an account for a plurality of business segments along with the homogeneity factor ratio for the account. FIG. 10 shows a table of example cosine similarity metrics for a plurality of accounts along with the homogeneity factor for the account.

Next, a self-boosted cosine similarity metric (SB-CSM) value is generated at step 335. HF gives more weightage to an accounts' Self CSM to factor the tendency to refresh the same products time and again, thus enabling a flavor of personalized recommendations. Accounts which are heterogeneous in their purchases, will have a relatively lower HF allowing them to learn more from the neighbors. The range of HF is [1, max no of LOBs].

FIG. 11 shows a table of example cosine similarity metrics for a plurality of accounts along with the homogeneity factor and a self-boosted cosine similarity metric for the account.

Next, at step 340 a rank threshold (RT) is calculated. In a B2C recommendation operation, the neighbor sample is often derived by a heuristic CSM threshold (e.g., 0.8). With such a recommendation operation, all accounts with a CSM greater than 0.8 are considered as neighbors for a given account. However, in a B2B recommendation operation this could lead to computational issues as some neighbor sets could have many accounts. To overcome this and provide a rich neighbor set, in certain embodiments the present recommendation operation generates the rank threshold metric. The rank threshold metric is derived so that each neighbor set should have accounts covering all the LOBs. The rank threshold metric is generated based on the LOB having the lowest account coverage. Thus, the rank threshold metric is generated as follows:

Rank Threshold (RT)=1÷(Lowest Account Coverage (%))

where RT is the number of accounts in the neighbor set.

Next at step 345, a principal component analysis operation is performed to provide a transformed revenue proportion (TRP) vector. In certain cases, a SB-CSM could be too high relative to the cosine similarity values of the accounts in the neighbor set. The principal component analysis operation adjusts for this condition, so that an account can learn from the neighbors. In certain embodiments, the principal component analysis operation is applied on each neighbor set using revenue proportion (RP) vectors as variables. The axis of the components is rotated such that a first principal component (FPC) has maximum information captured. The LOBs RP are then represented on this FPC. Thus the transformed revenue proportion vector provides a representation of the accounts in the neighbor set.

FIG. 12 shows a table of a plurality of accounts having a revenue proportion vector ((RP Matrix)*m by n). FIG. 13 shows a table of rotated principal component loading on each account revenue proportion vector ((PC1 Loadings)*n by 1). The single dimension of the LOB RPs (e.g., a LOB RP transformed revenue proportion (TRP)) are set forth as follows:

Single dimension representation of LOB RPs (TRP)
=Transpose (RP Matrix)$_{m\ by\ n}$*(PC1 Loadings)$_{n\ by\ 1}$ FIG. 14 shows a table of a plurality of accounts where the TRP is standardized between [0,1].

At step 350 a self-boosted cosine similarity metric (SB-CSM) normalization operation is performed. In certain embodiments when performing a self-boosted cosine similarity metric normalization operation, a RP vector for an account is scaled between [0, 1] and the cosine similarity between the TRP and the RP vector for the account is computed to adjust the self-boosted cosine similarity metric to provide an adjusted self-boosted cosine similarity metric.

FIG. 15 shows a table of a plurality of accounts where the principal account includes a normalized SB-CSM value.

Next at step 355, a weighted average score (WAS) is generated. In certain embodiments, the adjusted. SB-CSM is used to compute a weighted average score for each neighbor of an account. The weighted average scores are then sorted in descending order for each account to identify a top number of recommendations (e.g., a top three recommendations). Each account has an SB-CSM of its own and corresponding SB-CSMs with each neighbor account. The WAS is calculated as a sum product of these SB-CSMs with the revenue proportion divided by the sum of SB CSMs. This is computed for all LOBs for a given account. The resulting score for each LOB is sorted in descending order to obtain the top recommendation LOBs for a given account. Using the WAS, the operation can learn recommendations for an account from itself and also from neighboring accounts.

FIG. 16 shows a table of a plurality of accounts where the weighted average score for each LOB for an account are sorted.

Figure 17:
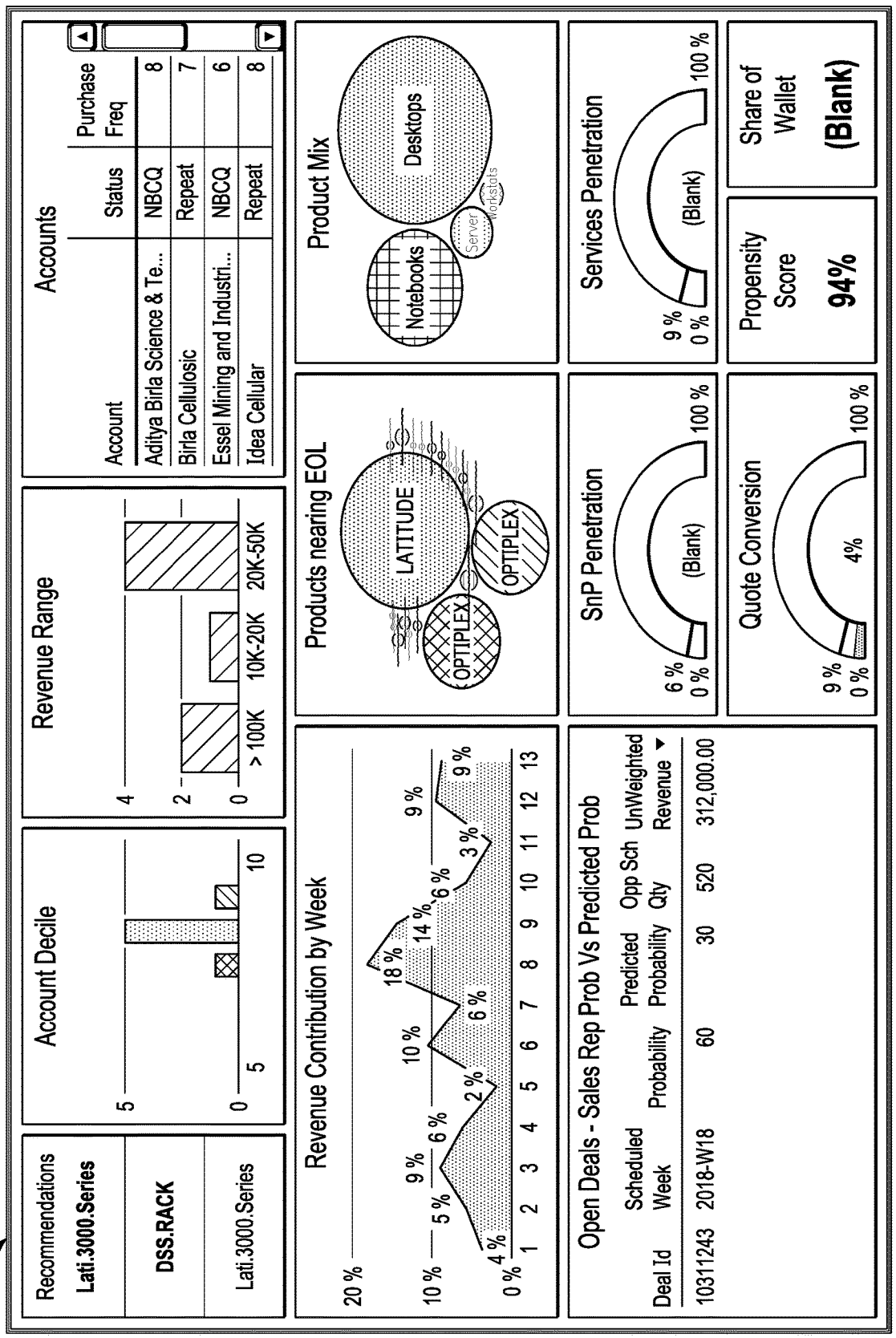
FIG. 17 shows a sample screen presentation of a digital sales predictor user interface.

Referring to FIG. 17, a sample screen presentation 1700 of a digital sales predictor user interface is shown. The sample screen presentation 1700 includes a recommendation portion 1710 via which recommendations identified via the recommendation operation are presented to a user via the digital sales predictor user interface.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a recommendation operation, comprising:

optimizing a product list to provide an optimized product list for use when generating a recommendation for an account, the optimized product list comprising a plurality of information handling systems, each of the plurality of information handling systems comprising a plurality of components;

optimizing a neighbor set to provide an optimized neighbor set for use when generating the recommendation for the account, the neighbor set representing interactions of other users from a same type of business;

boosting a self-cosine similarity metric to provide a boosted self-cosine similarity metric, the self-cosine similarity metric corresponding to the account, the boosted self-cosine metric being based upon past purchases of the account, the boosted self-cosine metric using a homogeneity factor of the account;

providing a recommendation for components to include in a product for the account, the recommendation being based on the optimized product list, the optimized neighbor set and the boosted self-cosine similarity metric;

fabricating the product via a custom product fabrication system, the product being fabricated to include components identified via the recommendation;

generating the homogeneity factor for the account as:

Homogeneity Factor (HF)=(Total number of Line of Businesses (LOBs))÷(Number of LOBs an account has purchased in the past)

generating a revenue proportion value, the revenue proportion value representing revenue of the account by business segment, the revenue proportion value being calculated as:

Revenue proportion (RP)=(AR for a LOB+PP for a LOB)÷(AR for all LOBs+PP for all LOBs)

For each account:
AR=Per quarter average revenue for each LOB
PP=Weighted Open Pipeline for immediate next quarter for each LOB generating a rank threshold derived from each neighbor set, the rank threshold being calculated as:

Rank Threshold (RT)=1÷(Lowest Account Coverage (%))

where RT is the number of accounts in the neighbor set;
generating a single dimension representation of lines of business having a revenue proportion for the account, the single dimension representation of lines of business being calculated as:

Single dimension representation of LOB RPs (TRP) =Transpose (RP Matrix)$_{m\ by\ n}$*(PC1 Loadings)$_{n\ by\ 1}$;

generating a weighted average score, the weighted average score using a boosted self-cosine similarity metric for the account and boosted self-cosine similarity metrics for each neighbor account; and,
using the weighted average score to learn recommendations from the account and the neighbor accounts.

2. The method of claim 1, further comprising:
normalizing the boosted self-cosine metric, the normalizing providing an adjusted boosted self-cosine metric.

3. The method of claim 1, wherein:
the recommendation operation uses collaborative filtering with self-boosted and principal component adjusted weights using an optimal neighbor set to generate recommendations.

4. The method of claim 1, wherein:
the recommendation operation is tailored for business to business (B2B) transactions.

5. The method of claim 1, wherein:
an interaction of the account is normalized via a principal component approach so that the recommendation operation learns from neighbors of the account.

6. The method of claim 1, wherein:
the recommendation operation considers an open sales pipeline when generating the recommendation.

7. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
optimizing a product list to provide an optimized product list for use when generating a recommendation for an account, the optimized product list comprising a plurality of information handling systems, each of the plurality of information handling systems comprising a plurality of components;
optimizing a neighbor set to provide an optimized neighbor set for use when generating the recommendation for the account, the neighbor set representing interactions of other users from a same type of business;
boosting a self-cosine similarity metric to provide a boosted self-cosine similarity metric, the self-cosine similarity metric corresponding to the account, the boosted self-cosine metric being based upon past purchases of the account the boosted self-cosine metric taking into account a homogeneity factor of the account;
providing a recommendation for components to include in a product for the account, the recommendation being based on the optimized product list, the optimized neighbor set and the boosted self-cosine similarity metric;
fabricating the product via a custom product fabrication system, the product being fabricated to include components identified via the recommendation;
generating the homogeneity factor for the account as:

Homogeneity Factor (HF)=(Total number of Line of Businesses (LOBs))÷(Number of LOBs an account has purchased in the past)

generating a revenue proportion value, the revenue proportion value representing revenue of the account by business segment, the revenue proportion value being calculated as:

Revenue proportion (RP)=(AR for a LOB+PP for a LOB)÷(AR for all LOBs+PP for all LOBs)

For each account:
AR=Per quarter average revenue for each LOB
PP=Weighted Open Pipeline for immediate next quarter for each LOB
generating a rank threshold derived from each neighbor set, the rank threshold being calculated as:

Rank Threshold (RT)=1÷(Lowest Account Coverage (%))

where RT is the number of accounts in the neighbor set;
generating a single dimension representation of lines of business having a revenue proportion for the account, the single dimension representation of lines of business being calculated as:

Single dimension representation of LOB RPs (TRP) =Transpose (RP Matrix)$_{m\ by\ n}$*(PC1 Loadings)$_{n\ by\ 1}$;

generating a weighted average score, the weighted average score using a boosted self-cosine similarity metric for the account and boosted self-cosine similarity metrics for each neighbor account; and,
using the weighted average score to learn recommendations from the account and the neighbor accounts.

8. The system of claim 7, wherein the instructions executable by the processor are further configured for:
normalizing the boosted self-cosine metric, the normalizing providing an adjusted boosted self-cosine metric.

9. The system of claim 7, wherein:
the recommendation operation uses collaborative filtering with self-boosted and principal component adjusted weights using an optimal neighbor set to generate recommendations.

10. The system of claim 7, wherein:
the recommendation operation is tailored for business to business (B2B) transactions.

11. The system of claim 7, wherein:
an interaction of the account is normalized via a principal component approach so that the recommendation operation learns from neighbors of the account.

12. The system of claim 7, wherein:
the recommendation operation considers an open sales pipeline when generating the recommendation.

13. A non-transitory, computer-readable storage medium embodying computer program code, the computer program code comprising computer executable instructions configured for:
optimizing a product list to provide an optimized product list for use when generating a recommendation for an account, the optimized product list comprising a plurality of information handling systems, each of the plurality of information handling systems comprising a plurality of components;

optimizing a neighbor set to provide an optimized neighbor set for use when generating the recommendation for the account, the neighbor set representing interactions of other users from a same type of business;

boosting a self-cosine similarity metric to provide a boosted self-cosine similarity metric, the self-cosine similarity metric corresponding to the account, the boosted self-cosine metric being based upon past purchases of the account the boosted self-cosine metric taking into account a homogeneity factor of the account;

providing a recommendation for components to include in a product for the account, the recommendation being based on the optimized product list, the optimized neighbor set and the boosted self-cosine similarity metric;

fabricating the product via a custom product fabrication system, the product being fabricated to include components identified via the recommendation;

generating the homogeneity factor for the account as:

Homogeneity Factor (HF)=(Total number of Line of Businesses (LOBs))÷(Number of LOBs an account has purchased in the past)

generating a revenue proportion value, the revenue proportion value representing revenue of the account by business segment, the revenue proportion value being calculated as:

Revenue proportion (RP)=(AR for a LOB+PP for a LOB)÷(AR for all LOBs+PP for all LOBs)

For each account:
AR=Per quarter average revenue for each LOB
PP=Weighted Open Pipeline for immediate next quarter for each LOB generating a rank threshold derived from each neighbor set, the rank threshold being calculated as:

Rank Threshold (RT)=1÷(Lowest Account Coverage (%))

where RT is the number of accounts in the neighbor set;

generating a single dimension representation of lines of business having a revenue proportion for the account, the single dimension representation of lines of business being calculated as:

Single dimension representation of LOB RPs (TRP) =Transpose (RP Matrix)$_{m\ by\ n}$*(PC1 Loadings)$_{n\ by\ 1}$;

generating a weighted average score, the weighted average score using a boosted self-cosine similarity metric for the account and boosted self-cosine similarity metrics for each neighbor account; and, using the weighted average score to learn recommendations from the account and the neighbor accounts.

14. The non-transitory, computer-readable storage medium of claim 13, wherein the computer executable instructions are further configured for:
normalizing the boosted self-cosine metric, the normalizing providing an adjusted boosted self-cosine metric.

15. The non-transitory, computer-readable storage medium of claim 13, wherein:
the recommendation operation uses collaborative filtering with self-boosted and principal component adjusted weights using an optimal neighbor set to generate recommendations.

16. The non-transitory, computer-readable storage medium of claim 13, wherein:
the recommendation operation is tailored for business to business (B2B) transactions.

17. The non-transitory, computer-readable storage medium of claim 13, wherein:
an interaction of the account is normalized via a principal component approach so that the recommendation operation learns from neighbors of the account.

18. The non-transitory, computer-readable storage medium of claim 13, wherein:
the recommendation operation considers an open sales pipeline when generating the recommendation.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *